Aug. 26, 1930.  J. E. LEA  1,773,816
APPARATUS FOR MEASURING GRANULAR MATERIALS VOLUMETRICALLY
Filed May 4, 1923   3 Sheets-Sheet 1

Inventor:
James Edward Lea
By his Attorney: Walter Gunn

Aug. 26, 1930.  J. E. LEA  1,773,816
APPARATUS FOR MEASURING GRANULAR MATERIALS VOLUMETRICALLY
Filed May 4, 1923  3 Sheets-Sheet 3

Inventor:-
James Edward Lea.
By his Attorney: Walker Gunn

Patented Aug. 26, 1930

1,773,816

UNITED STATES PATENT OFFICE

JAMES EDWARD LEA, OF MANCHESTER, ENGLAND

APPARATUS FOR MEASURING GRANULAR MATERIALS VOLUMETRICALLY

Application filed May 4, 1923, Serial No. 636,761, and in Great Britain July 28, 1922.

This invention refers to and consists of improved apparatus for measuring granular materials volumetrically, its main object being to provide measuring means which will operate however small the quantity of material to be measured, and which will automatically cease to measure when no material is passing through the apparatus.

According to the invention, the improved apparatus comprises an endless belt conveyor on to which the material to be measured is placed, either from a hopper or chute, or by hand shovelling. Said apparatus also comprises an appliance, constituting a measuring element, which is free to ride or "float" on the top surface of the layer of granular material while said material is being moved forward by the conveyor, and which, when no material is passing, automatically comes to rest on the conveyor.

The measuring element and the conveyor are operatively connected to an instrument for indicating and/or recording the measurement of the material, such instrument being preferably of the kind forming the subject of my prior Patent No. 1,293,130. The conveyor is coupled to the toothed integrating drum and the said measuring element is operatively connected to the sliding pinion of the instrument.

By employing a measuring element free to act by gravity and to rise and fall with variations in the thickness of the layer of granular material being moved forward by the conveyor, the apparatus continues to measure even after the layer of material has become less than the normal thickness, and furthermore, when no material is passing it entirely ceases to measure even though the conveyor may continue in motion.

The invention will be more particularly described by the aid of the accompanying drawings, wherein:—

Figure 1:
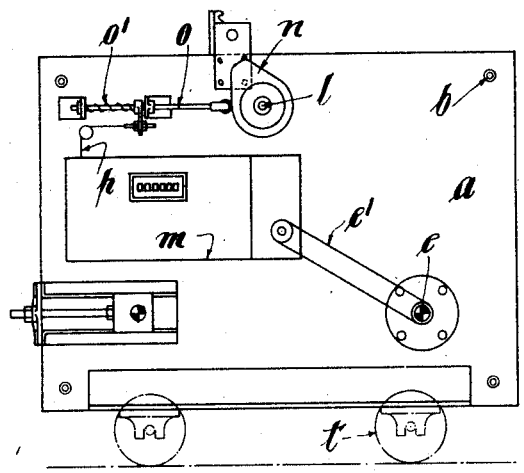
Fig. 1 is a side elevation of apparatus constructed according to the invention for measuring granular materials volumetrically.
Figure 3:
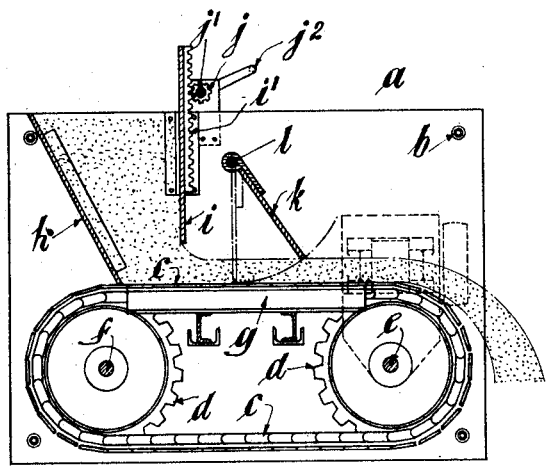
Fig. 3 is a sectional elevation of Figure 1.
Figures 2, 4:
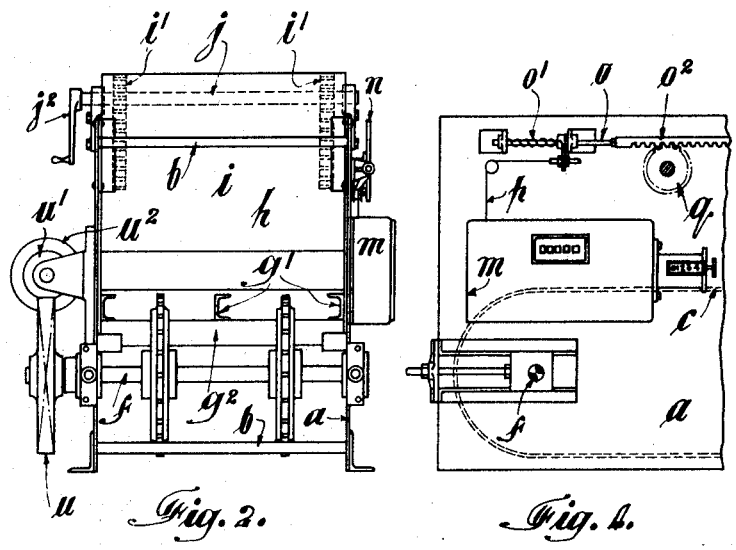
Fig. 2 is an end elevation of Figure 1 with the conveyor slats removed.
Fig. 4 shows in detail modified means of imparting movement to the meter pinion from the measuring element.

In carrying out the invention, as illustrated in Figures 1 to 3 the improved machine comprises two rectangular side frames or plates $a, a$, lying at a distance apart, and firmly connected one to the other by stay rods $b$. Arranged between said plates is an endless belt conveyor $c$, the drums or wheels $d$ carrying the conveyor being mounted on shafts $e, f$ which have their bearings in the side plates $a$, or in bosses fitted thereto, one near each end. The side frames extend well above the top face of the conveyor, and the top surface of the conveyor and the side frames lie at right angles thereby forming an open trough or channel.

Below the upper half of the belt or conveyor $c$ is a rigid support $g$ upon which the conveyor may slide so as to prevent the conveyor sagging.

Above the conveyor $c$, and between the side frames $a$ near one end, are two transverse partitions $h$ and $i$ respectively see Figure 3, which, in conjunction with the said side frames, form a hopper. The partition $h$ is inclined and has its lower edge lying close to the upper face of the conveyor $c$ and the other partition $i$ is vertical with its lower edge lying at a suitable distance above the upper face of the conveyor, in order to provide an orifice between itself and the conveyor for the granular material to pass through when carried forward by the conveyor. Such orifice may be capable of regulation by means of a door or shutter; or the partition itself may be adjustable as illustrated to racks $i^1$ being secured to the back thereof and meshing with said racks are two pinions $j^1, j^1$ rigidly secured to a shaft $j$ journaled in bearings on the side frames $a$ a handle $j^2$ being provided by means of which the shaft may be rotated to raise or lower the partition $i$.

On the outlet side of the hopper and at any distance therefrom is arranged the said measuring appliance, which is adapted to contact on its lower edge with the conveyor $c$, when no material is passing or when the hopper is empty, but which is raised by the material when any is carried forward by the conveyor from the hopper.

The measuring appliance consists of a metal plate $k$ (with or without a roller at its lower edge) mounted on a cross shaft $l$ at its upper edge, the plate being free to swing or move in the arc of a circle (indicated in dotted lines) as the thickness of the layer of material on the conveyor $c$ increases or decreases, and its lower edge being adapted to rest on the conveyor as shown when no material is passing.

The vertical edges of the measuring element K lies close to and parallel with the faces of the side frames $a$, and the bottom edge of the appliance lies parallel with the top surface of the conveyor $c$.

Upon one side of the machine is mounted the instrument for indicating or/and recording the quantity of material that may pass through the machine. An instrument $m$ made according to my former Patent No. 1,293,130 being shown. The toothed drum not shown on the instrument $m$ is geared to the shaft $e$ of the conveyor by means of the chair $e^1$ and the sliding pinion is controlled by the aforesaid measuring appliance $k$.

When the appliance has an angular or swinging movement about a horizontal axle, the movement may be transmitted to the said pinion as shown, through a cam $n$ secured to the axle $l$ of the plate $k$ and acting upon a sliding rod $o$, this latter being held in yielding contact with the edge of this cam by a spring $o^1$, and being connected by a cord $p$ to the rod carrying the pinion not shown. Said cam $n$ is of a contour which imparts to the rod $o$ an endwise movement directly proportional to the vertical movement of the bottom edge of the float plate $k$ above the conveyor $c$, or the thickness of the layer of material, so that with the toothed drum of the instrument formed to a regular "curve" corresponding to the rate of flow for different degrees of opening for the material, the instrument will correctly indicate the total of the material passed through the machine.

In place of the cam, $n$, a toothed wheel $q$ see Figure 4, may be used, meshing with a rack $o^2$, carried by the slide rod $o$, in which case the "curve" of the toothed drum of the instrument will be plotted to suit the variations in the rate of flow of material relatively to the angular movements of the measuring appliance, instead of the vertical movements of its lower edge.

To reduce the weight and friction of the float plate on the material or to make it more sensitive in action, it may be provided with a counter-balance weight.

The conveyor $c$ may be made of balata or other fibrous material, or it may be made of links or chains and metal slats as shown, the edges of the slats when horizontal, abutting or overlapping.

The means $g$ for supporting the upper part of the conveyor to prevent sagging may consist of channel iron bars $g^1$ arranged one below each edge of the conveyor and one below the centre of the conveyor, the several bars being supported by cross bars $g^2$ connected to the side frames.

Figures 5, 6:
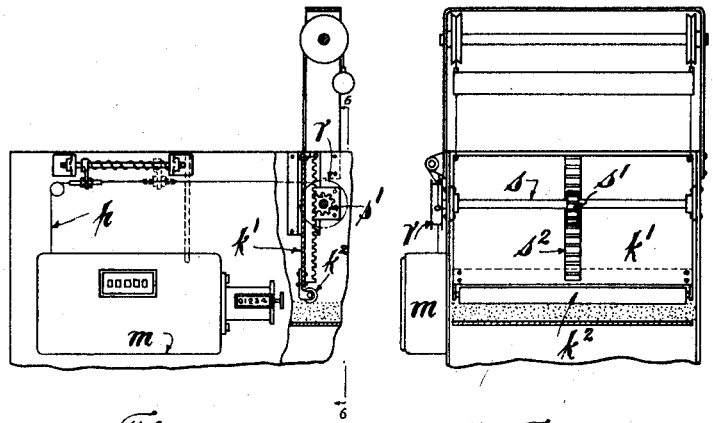
Fig. 5 is a detail view partly in section showing one end of a modified form of the apparatus.
Fig. 6 is a cross-sectional elevation on the line 6, 6 Figure 5.

In the example shown in Figures 5 and 6 the measuring appliance $k^1$ partakes of the form of a rectangular plate or frame equal in width to the conveyor and arranged to move freely in vertical guides and having at its lower edge a roller $k^2$. The plate $k^1$ and roller $k^2$ rise as the layer of granular material passes below them, or descend by gravity as the thickness of the layer of material diminishes and reaching its lowest point when no material is passing. In this case the cord $p$ is attached to a drum $r$ on a spindle $s$ to which a pinion $s^1$ is attached and which meshes with a rack $s^2$ secured to the plate $k^1$ so that as the latter rises and falls rotary movement is imparted to the drum $r$ to move the movable meter-pinion through the cord $p$.

Alternatively the measuring element may consist of a roller only which is free to rise and fall in suitable vertical guides on the frame. Or said guide and the guides in the last examples may be inclined if desired and the movement of the plate may be transmitted to the sliding pinion of the indicating instrument by means of a cord or chain, working around or over guide pulleys.

For convenience in moving it from place to place the machine may be mounted on wheels $t$. On one size of the machine suitable for dealing with 20 tons of coal per hour, the side frames will be about 5' long by 3' 6" high. For enabling the machine to be driven by motive power, a worm wheel $u$ will be fitted to one of the conveyor shafts, and in a bracket on the side frame will be a short shaft fitted with a worm $u^1$, which meshes with the worm wheel $u$, said shaft also being fitted with a belt pulley or chain heel $u^2$.

To vary the rate of delivery of the machine, the upward movements of the said measuring appliance may be limited by means say of a pin fitted into one or other of a series of holes in a fixed quadrant bracket.

Whilst preferring to employ a measuring appliance free to ride or float on the granular material passing through the machine so that the machine will not register when empty, it will be obvious that a regulatable appliance may be employed, that is to say, the appliance may be adjusted to various set positions. In this case, the appliance may be combined with the hopper.

To allow for adjustment of the conveyor, the conveyor shaft $f$ at one end of the machine is mounted in slide bearings, capable of being regulated by screws.

Apparatus for indicating the "rate of flow" of the material at any moment through the machine may also be applied as indicated in Figure 4, such apparatus being preferably of the kind forming the subject of my prior application for Patent in Great Britain No. 24,087/21.

Figure 7:
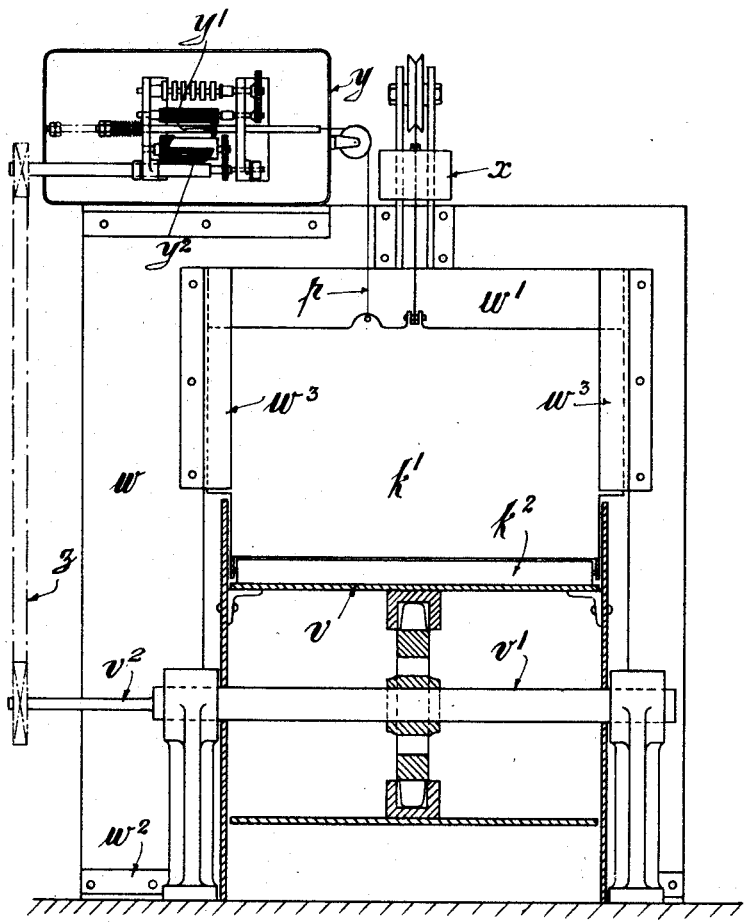
Fig. 7 shows a form of the measuring appliance shown applied to an existing endless band conveyor.

In Figure 7 the improved measuring apparatus is shown applied to an existing conveyor $v$. In this case a frame $w$, in the form of a metal plate is provided, formed with an opening $w^1$ through which the conveyor $v$ passes, said plate being secured in position, transversely of the conveyor by angle-iron brackets $w^2$.

Mounted on the frame $w$ is the measuring appliance $k^1$ in the form of a rectangular plate the lower part of which is equal in width to the conveyor and arranged to move freely in vertical guides $w^3$ and having at its lower edge the roller $k^2$. The plate $k^1$ is counterbalanced by the weight $x$ so that said plate together with the rollers $k^2$ freely rise and fall according to the thickness of the layer of material passing below the same on the conveyor. The cord $p$ attached to the sliding pinion $y^1$ of the recording instrument $y$ carried by the frame $w$ is attached to said plate $k^1$ and the toothed drum $y^2$ of said instrument is geared to an extension $v^2$ of the shaft $v^1$ of the conveyor $v$ by means of the chain $z$.

The improved apparatus (conveyor and measuring element) will usually be enclosed between vertical side cheeks, whereby the "orifice" through which the material has to pass will be of fixed or regular cross section. Further, the maximum thickness of the layer of granular material will usually be determined by the door or regulator of the hopper as the material passes therefrom. Where no hopper is used a special device may be provided to level down the material, prior to passing below the measuring element.

To reduce friction and to afford a more sensitive action, the measuring element may in all cases be counter-weighted. Countra-wise, the measuring element (especially when in the form of a roller) may be weighted in order to level down the granular material.

When used alone, that is, apart from a hopper with door or sluice, the improved measuring element may be furnished with means, such as a perforated quadrant and loose pin or peg, whereby the rise of the element may be limited to a predetermined height.

What I claim is:

In apparatus for the continuous volumetric measurement of solids in granular form, an endless conveyor composed of flat bars and chains, each bar being secured to one of the chain links, toothed wheels with which the chains engage, and axles for the wheels, side plates in which the axles are journaled, the plates extending high above the wheels, rods connecting and positioning the plates, a fixed inclined cross plate between the side plates and near to one end, its lower edge lying close to the top face of the conveyor bars, a further and vertical cross-plate between the side plates, and in conjunction with the inclined plate and side plates, forming a hopper, the lower edge of the vertical plate lying at a distance away from the top surface of the conveyor bars, means for regulating the height of said vertical cross plate, a shaft extending from side plate to side plate and journaled therein, a swing plate connected to such shaft and adapted when vertical almost to touch the conveyor plates, an integrating instrument secured to the exterior face of one of the side plates, said instrument comprising wheels marked in terms of weight, an endless chain for driving one main element of said instrument from one of the conveyor wheel axles, a cam keyed to the shaft carrying the swing plate, a spring-pressed sliding rod and roller, the latter engaging the periphery of the cam, means for supporting the rod, and means for conveying the movements of the rod to the other main element of the said instrument, the presence of a layer of granular material on the conveyor, and the movement of same with the conveyor, causing angular movement of the swing plate and cam, and endwise movement in one direction of the sliding rod, the cam being of such a contour that the movements of the sliding rod are directly proportional to the volumetric measurement of the layer of material as it moves forward with the conveyor, as set forth.

In testimony whereof I have signed my name to this specification.

JAMES EDWARD LEA.